(12) United States Patent
Laux

(10) Patent No.: US 7,048,942 B2
(45) Date of Patent: May 23, 2006

(54) PACKAGING FOR A PLASTER CONTAINING ACTIVE INGREDIENTS

(75) Inventor: Wolfgang Laux, Diez (DE)

(73) Assignee: LTS Lohmann Therapie-Systeme AG, Andernach (DE)

( * ) Notice: Subject to any disclaimer, the term of this patent is extended or adjusted under 35 U.S.C. 154(b) by 48 days.

(21) Appl. No.: 10/204,622

(22) PCT Filed: Feb. 10, 2001

(86) PCT No.: PCT/EP01/01487

§ 371 (c)(1),
(2), (4) Date: Oct. 10, 2002

(87) PCT Pub. No.: WO01/62489

PCT Pub. Date: Aug. 30, 2001

(65) Prior Publication Data

US 2003/0113492 A1    Jun. 19, 2003

(30) Foreign Application Priority Data

Feb. 22, 2000   (DE) ................... 100 07 942

(51) Int. Cl.
*B32B 7/06* (2006.01)
*B32B 33/00* (2006.01)

(52) U.S. Cl. .............. 424/449; 424/443; 424/444; 428/352; 428/354; 428/447; 428/34.3; 206/438; 206/440; 206/460; 206/484; 206/813

(58) Field of Classification Search ............... 424/449, 424/443, 444; 428/352, 354, 447, 34.3; 206/438, 206/440, 460, 484, 813
See application file for complete search history.

(56) References Cited

U.S. PATENT DOCUMENTS

| 3,690,909 | A |   | 9/1972  | Finley |
|-----------|---|---|---------|--------|
| 5,423,737 | A | * | 6/1995  | Cartmell et al. ............... 602/57 |
| 5,505,306 | A |   | 4/1996  | Akemi et al. |
| 5,567,488 | A | * | 10/1996 | Allen et al. ................ 428/34.1 |
| 5,567,489 | A | * | 10/1996 | Allen et al. ................ 428/34.1 |

FOREIGN PATENT DOCUMENTS

| DE | 196 11 665 C1 | 10/1997 |
| DE | 198 20 274 A1 | 11/1999 |
| DE | 694 22 094 T2 | 4/2000 |
| EP | 0 635 262 B1 | 12/1999 |
| JP | 50 092982 A | 7/1975 |
| WO | 95 07817 A | 2/1995 |
| WO | 95 07816 A | 3/1995 |

* cited by examiner

*Primary Examiner*—Daniel Zirker
(74) *Attorney, Agent, or Firm*—Birch, Stewart, Kolasch & Birch, LLP

(57) ABSTRACT

A packing material is in the form of packaging laminate for packing transdermal therapeutic systems. The packing material contains at least a sealable layer and a barrier layer, and the sealable layer is provided with a continuous abhesive layer. The sealable layer can be provided with a silicone film or a silicone layer as the abhesive layer. The abhesive layer can have a thickness of less than 10 μm, preferably less than 5 μm.

6 Claims, 1 Drawing Sheet

PACKAGING FOR A PLASTER CONTAINING ACTIVE INGREDIENTS

This application is the national phase under 35 U.S.C. § 371 of PCT International Application No. PCT/EP01/01487 which has an International filing date of Feb. 10, 2001, which designated the United States of America.

BACKGROUND OF THE INVENTION

1. Field of the Invention

The invention relates to a packing material and to a pack for active substance patches, especially for transdermal therapeutic systems. The invention further embraces processes for producing such a packing material and such a pack, and to a process for packaging active substance patches using the packing materials of the invention.

2. Description of the Related Art

Transdermal therapeutic systems (TTS) are patches comprising active substances or drugs and have been introduced on the market as such. Because of their ability to provide controllable release of pharmacologically active substances to the body via the skin over a prolonged period of time, they possess a range of advantages over other drug forms.

TTS generally possess pressure-sensitively adhering layers which are intended to enable their attachment to the skin. During storage and before application to the skin, these layers are covered on the adhesive side with a removable protective layer. However, this layer is unable to prevent, or to prevent completely, the emergence of small amounts of the pressure-sensitively adhering material, especially at the side edge regions, in the course of storage, as a consequence of the "cold flow"—and to an increased extent at slightly raised temperatures. One consequence of this may be that the TTS stick to the inside of their surrounding packaging, which in turn complicates handling on removal from the packaging and which may cause a TTS to be destroyed. This not only gives rise to avoidable costs but also impairs the acceptance of these drug forms among users.

Further requirements on packaging suitable for TTS arise from the fact that TTS may also comprise volatile ingredients, e.g., volatile active substances or excipients, whose release to the environment must be prevented. It is likewise necessary to rule out reaction between ingredients of the TTS and the packaging material, and vice versa.

For these reasons, TTS are normally packaged in what are known as sealed bags, which are composed of a double ply of a laminate. Said laminate has at least two, but generally more, layers.

Commonly, the inward-facing layer is sealable. It is very common in the packaging of TTS to carry out edge sealing using heat, producing a virtually homogeneous bond between the sealing layers of the upper and lower sealing laminate. An alternative possibility, in principle, is that of cold sealing, using for example moisture, solvents or other contact auxiliaries, e.g. known cold sealing compositions.

In order to bring about the required imperviousness toward losses of active substances or other ingredients, some of which are volatile, the customary packing materials used for packaging TTS are additionally furnished with a barrier layer. In general, this is the next innermost layer after the sealing layer. The barrier layer may be composed, for example, of a continuous metal layer (usually aluminum), although in principle a diffusion-type polymer material such as polyethylene terephthalate, for example, may be suitable.

In addition, the packages may be provided with further layers, generally attached on the outside, which may be composed, for example, of paper or of polymer films. These layers are, for example, for enhanced printability, for security against unwanted destruction by tearing (child safety), or an esthetically appealing design.

One disadvantage of the packs known from the prior art is the absence of any devices which prevent the full or partial sticking of the TTS present in the pack to the inside of the pack or of the packing material. This is a problem on account of the fact that there are a number of TTS or active substance patches which, owing to their composition or ingredients, are especially sensitive and tend to stick to the packing material.

It is true that sticking on the inside of the pack can in principle be prevented by providing the inside with a silicone coating. However, because silicones are not sealable, it is necessary during the production process to ensure that the edges of the packing material, intended for sealing, are not siliconized; in other words, these packing materials are provided only with a partial, noncontinuous siliconization. On the one hand this requires a corresponding production process, which produces silicon-free edges, and on the other hand it has the consequence that, when packing the TTS, precise positioning on the abhesively coated area of the packing material to be sealed is necessary.

SUMMARY OF THE INVENTION

In order to solve this problem, the invention proposes, for a packing material in the form of a packaging laminate having the general features of a packing material in the form of a packaging laminate for packing transdermal therapeutic systems, and providing the sealable inner layer with a continuous abhesive coating.

This is preferably achieved by providing the sealable layer with a silicone film or silicone layer as an abhesive coating, in the form of a silicone film, for example. The result of the stated measures is that the sealable layer is furnished with an abhesive (or antiadhesive) surface. In order that the abhesively coated layer remains sealable, the thickness of the silicone layer must be as low as possible. Surprisingly it has been found that sealing of the sealable layer thus coated is possible provided the thickness of the silicone layer is not greater than 10 μm, preferably less than 5 μm.

In accordance with the invention, the packing material of the invention comprises a packaging laminate which comprises at least two layers, a sealable layer and an impermeable barrier layer. The "sealable layer" (also called sealing layer) of the packaging laminate is the layer which forms the inner wall of the pack produced from it. The abhesive, i.e., antiadhesive, coating of this inner wall reduces the risk of the TTS present in the pack clinging to the inner wall of the pack. If, nevertheless, any slight clinging should occur, as a consequence for example of prolonged storage or elevated temperatures, the detachment of the TTS without destruction is made much easier as a result of the abhesive coating.

The continuous, i.e., full-area, abhesive coating of the sealing layer also simplifies the production and packaging process as compared with the prior art packing materials with only partial siliconization, especially in view of the fact that during packing it is not important to position the TTS precisely on the abhesively coated area of the packing material.

The barrier layer of the packing materials of the invention is substantially impermeable to gas, air, water vapor and/or moisture, in order to ensure optimum protection for the TTS to be packed. The materials suitable for producing such barrier layers, and the materials suitable for producing sealable layers, are known fundamentally to the skilled worker.

Besides the barrier layer and the abhesively coated sealable layer, the packing material of the invention, in the form of packaging laminate, may also comprise further, additional layers, although the abhesive inner layer always forms the inner wall of the pack.

BRIEF DESCRIPTION OF THE DRAWING

An exemplary embodiment of a packing material of the invention in the form of a packaging laminate is depicted in FIG. 1.

DETAILED DESCRIPTION

Figure 1:
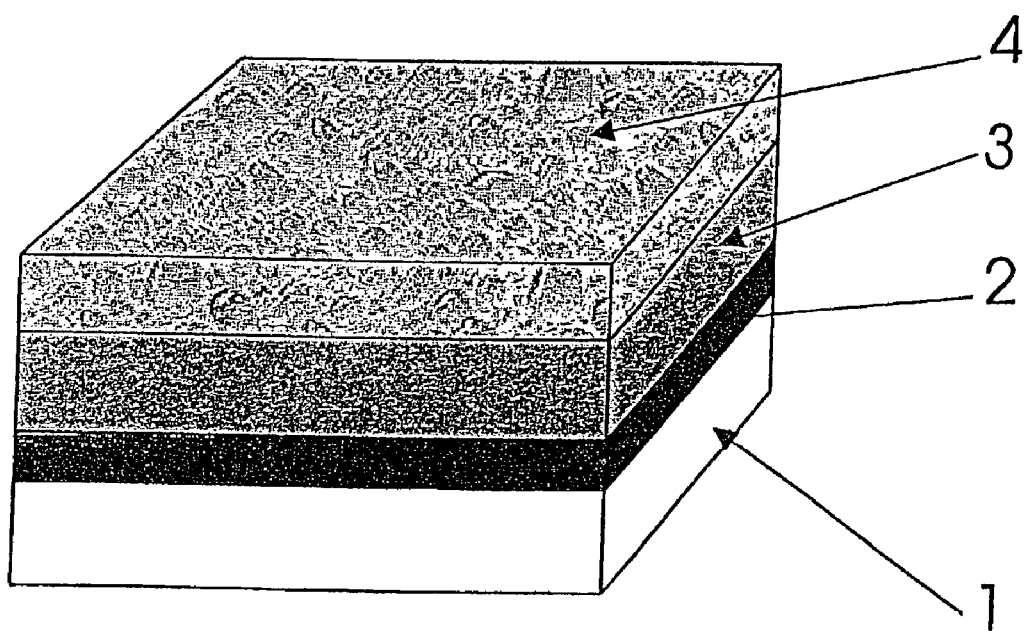

In FIG. 1, (1) denotes the outer layer or outer layers of the laminate, (2) the barrier layer, (3) the sealing layer, and (4) the abhesive layer or abhesive film applied to the sealing layer.

The packing materials of the invention can be produced in a variety of ways. Fundamentally, the packaging laminate can be produced by means of processes which are common for producing multilayer laminates. In general, the processes in question are continuous.

One preferred production process envisages applying the base material used for producing the sealing layer to a prefabricated barrier layer or to an intermediate substrate by using shearing, solvents or heat. This can be realized by means of a variety of known application techniques.

Following drying where appropriate, silicone or a silicone-containing solution is applied to the prefabricated sealing layer by means of spray methods or using a different application method, so forming an abhesive film or layer on said sealing layer. It is likewise possible for silicone or a silicone-containing solution to be applied in said way to the surface of a sealing layer which is present in a layer composite in the form of a packaging laminate. After the silicone-containing solution has been applied, the solvent present in the silicone layer produced or in the silicone film is preferably removed by drying.

The abovementioned intermediate substrate comprises a further film, lying between the sealing layer and the abhesive layer.

The silicone may be used in the form of a one-component silicone solution, a two-component silicone solution, a silicone oil and/or a silicone-containing solution blended with other polymers (e.g., polybutylene, polyisobutylene). Additionally, instead of silicone, it is possible to use other abhesive polymers, examples being fluoroethylene polymers.

The abhesive layer possesses a thickness of no greater than 10 µm. A thickness of less than 5 µm is preferred.

In order to package TTS by means of the packing materials of the invention, the individualized TTS are each introduced between two packaging laminates, in such a way that the TTS comes to lie between the abhesive surfaces of the sealable layers. Next, the packaging laminates are sealed in the edge regions. As a result, sealed bags are formed inside which there is a TTS, the inside—which may come into contact with the TTS—being provided with abhesive surfaces.

The invention is not restricted to the packing of TTS or active substance patches; rather, the packaging laminates of the invention or packs of the invention can also be used with advantage for packing other products having comparable properties. These include in particular those products which in the course of storage, possibly under the effects of increased ambient temperatures, tend to develop a surface stickiness or to give up sticky ingredients to the surface. They may include not only medical products or drug forms but also cosmetic or hygiene products, and also foodstuffs.

The invention is illustrated by FIG. 1.

FIG. 1

Depicted by way of example is a packing material of the invention in the form of a multilayer packaging laminate, the layers being shown in section.

(1) denotes the outer layer or outer layers of the laminate in the form of a packing material. Materials suitable for this purpose are, for example, paper, polyethylene terephthalate (PET) or polyethylene film.

(2) denotes the barrier layer, which is substantially impermeable to water vapor. Aluminum foil, for example, is suitable for this layer.

(3) denotes the sealing layer. Examples of suitable base materials are polyurethane, Surlyn, PE, PAN, and Barex.

(4) denotes the abhesive layer or abhesive film applied to the sealing layer. This is preferably a continuous silicone film or silicone layer with a thickness of preferably less than 5 µm.

The underside of the laminate shown, i.e., layer (1), forms the outside of the sealed bag after sealing, while the sealing layer (4) represents the inside of the pack of the invention.

What is claimed is:

1. A process for packing transdermal therapeutic systems, in which process the transdermal therapeutic systems are sealed between two packaging laminates lying one above the other, comprising:

providing a packing material in a form of a packaging laminate for packing transdermal therapeutic systems, said laminate comprising a sealable layer and a barrier layer, wherein the sealable layer is provided with an abhesive surface formed by a continuous abhesive layer which has a thickness of 10 µm or less; and sealing two of said packaging laminates in such a way that the abhesive surfaces of the sealable layers of said two packaging laminates face toward the transdermal therapeutic system to be packed.

2. The process as claimed in claim 1, wherein the sealable layer is provided with a silicone film or silicone layer as said abhesive layer.

3. The process as claimed in claim 1, wherein the abhesive layer has a thickness of 5 µm or less.

4. The process as claimed in claim 1, wherein the abhesive layer is produced by spray application.

5. The process as claimed in claim 1, wherein the abhesive layer is present in dried form.

6. The process as claimed in claim 1, wherein the packing laminate comprises one or more outer layers on a surface of the laminate which lies opposite to the abhesive surface.

* * * * *